United States Patent
Wegner

(10) Patent No.: US 6,728,554 B1
(45) Date of Patent: Apr. 27, 2004

(54) WIRELESS COMMUNICATION NETWORK

(75) Inventor: Allan Wegner, Del Mar, CA (US)

(73) Assignee: International Systems, LLC, San Diego, CA (US)

( * ) Notice: Subject to any disclaimer, the term of this patent is extended or adjusted under 35 U.S.C. 154(b) by 26 days.

(21) Appl. No.: 09/659,010

(22) Filed: Sep. 11, 2000

(51) Int. Cl.[7] .................................................. H04B 1/38
(52) U.S. Cl. ..................... 455/562.1; 455/272; 342/373; 343/799
(58) Field of Search .................................. 455/562, 561, 455/560, 296, 272, 273, 269, 226.1–226.3, 422, 423, 424, 446–449, 25–63, 121; 342/373, 374, 432–437; 343/799, 800, 810–820

(56) References Cited

U.S. PATENT DOCUMENTS

| | | | | |
|---|---|---|---|---|
| 5,596,333 A | * | 1/1997 | Bruckert | 342/457 |
| 5,648,968 A | * | 7/1997 | Reudink | 370/335 |
| 5,815,116 A | * | 9/1998 | Dunbridge et al. | 342/373 |
| 5,936,569 A | * | 8/1999 | Stahle et al. | 342/174 |
| 5,936,577 A | * | 8/1999 | Shoki et al. | 342/373 |
| 6,038,459 A | * | 3/2000 | Searle et al. | 455/562 |
| 6,188,913 B1 | * | 2/2001 | Fukagawa et al. | 455/562 |
| 6,229,481 B1 | * | 5/2001 | Katz | 342/367 |
| 6,246,674 B1 | * | 6/2001 | Feuerstein et al. | 370/334 |
| 6,317,100 B1 | * | 11/2001 | Elson et al. | 343/853 |

* cited by examiner

*Primary Examiner*—Charles Appiah
*Assistant Examiner*—Charles Craver
(74) *Attorney, Agent, or Firm*—Donn K. Harms

(57) ABSTRACT

A wireless communication network which includes an antenna array for receiving and transmitting signals to and from remote users which is capable of adapting to widely varying traffic levels. Different antenna elements can be turned on during high user periods and off when there are fewer users. Also, beam width can be varied, with fewer antennas having wide beams in use when traffic levels are low and more antennas with narrow beams when traffic is high. Generally, the maximum capability uses 180 antenna elements with beam widths of about 2° to cover a full 360°. This network can act as either a circuit switched network or a packet switched network, as desired.

11 Claims, 3 Drawing Sheets

WIRELESS COMMUNICATION NETWORK

FIELD OF THE INVENTION

This invention relates to wireless communication networks for voice and broadband data communication with fixed or mobile remote terminals.

BACKGROUND OF THE INVENTION

Cellular communication systems providing mobile telephone service and other services have come into general use worldwide. These cellular systems divide geographical areas into small contiguous geographical cells. A base station is located within each cell for communication with users within that cell.

Since the cells are relatively small a very large number of cells must be provided to cover a large area. Extensive equipment must be provided at each cell base station, including mobile switching centers, base station controllers and base station transceivers. Thus, there is a need for expanded cell sizes to reduce the number of base station sites.

Current transmission systems generally employ low power directional antennas that are either omni-directional using one antenna or use several antennas to cover either two 180-degree or three 120-degree relatively short-range (3 to 7 km radius) sectors. Each sector has an inflexible fixed radiation pattern.

A user moving from one cell area to another during a voice or data transmission often experiences changes in signal level and quality. Interference between adjacent cells also can reduce signal quality. A cell base station service will suffer when an overly large number of users are active within that cell at one time. Adding sufficient equipment to handle very high traffic levels in every cell, even though traffic levels are normally low, is very expensive. Improvements in system handoff between cells and the ability to handle higher volume without maximizing resources in every cell are needed.

Attempts have been made to improve cell system efficiency by providing an antenna system forming number of narrow beams each covering a sector around the base station instead of an omnidirectional antenna, as described by Searle et al. in U.S. Pat. No. 5,596,329. While this arrangement has some advantages, it has problems with efficiently handling large differences in traffic between high and low usage periods.

Thus, there is a continuing need for improvements in cellular communications systems to greatly reduce the number of base station sites require to cover a specific geographic area, to reduce costs for infrastructure equipment and related service and operating costs, to permit reallocation of network resources to service peak busy periods, to permit easy and inexpensive expansion of a system as traffic increases, to minimize adjacent cell interference and to optimize handoff between cells.

SUMMARY OF THE INVENTION

The above-noted problems, and others, are overcome in accordance with this invention by a wireless communications network which basically comprises a plurality of transmit and receive antenna elements making up an antenna array, a plurality of amplifier modules corresponding to antenna array, a multiplexer in circuit-switched network (CSN) or a router in packet switched network (PSN) versions to combine and route the multiple circuit switched or packetized serial digital data streams to and from a central office and transceiver modem modules to convert an incoming, serial, digital data stream to a modulated radio frequency stream for transmission to a remote user (in one version the modem modules convert between digital and intermediate frequency and a second conversion modules converts between intermediate frequency and radio frequency). In most versions a switchable Butler matrix is preferably included to cause a beam of desired beamwidth to be radiated in accordance with a microprocessor-based controller. A receiver beam shaper/null steerer is preferably included to optimize the received beam shape for each channel to maximize received signal-to-noise ratio.

The transmission system of this invention uses a single site with variable and changeable on demand antenna radiation (beam) patterns. The radiation patterns are rendered changeable by the provision of multiple individual beams that typically vary in angular width from about 2 to 120 degrees. Each sector can support communications with multiple remote users with the number of simultaneous users per sector dependent on the International Communications Union standard employed (e.g., AMPS, GSM, CDMA, UMTS)

As the number of users within a given angular sector increases, in the system of this invention the beam size can be reduced by adding new beams, thus maintaining the number of users per beam. Similarly, as the number of users in a sector decreases, that sectors=users can be folded into adjacent sectors, thus reducing the number of active sectors. In this manner network resources are conserved and optimized to handle the diurnal changes in traffic patterns that naturally occur. Prior systems require the deployment of sufficient equipment to many sites to handle the peak hour traffic at each site without the ability to share network resources.

For optimum performance, minimum beamwidth is about 2 degrees. A 2-degree beamwidth for a uniformly weighted aperture requires a width of approximately 9.5 meters at 900 MHZ and 3.6 meters at 2.4 Ghz. A 25–30% larger aperture than the uniform aperture is preferred since sidelobe control is needed to maximize the number of simultaneous users per beam.

Each beam requires its own dedicated set of system resources; namely, transceivers, modems and antenna element feed network. Additionally, a number of system resources such as antenna elements, switching networks and controllers can be shared among beams. Each collection of antenna elements that form a beam covering a sector is driven by a suite of equipment that includes a switch path, modems, transmitters and receivers with the information that is being transported coming from external networks. With this novel system, there is a significant reduction in the system resources required, resulting in a substantial reduction in the cost of each base station transmission facility.

With the narrower beamwidths of this system and with the resulting higher antenna gains this system can provide reliable communications over a distance of 30 km or greater. The increased range capability significantly reduces the number of required base stations. This novel system will support both packet switched networks that are currently used to support data communications and circuit switched networks as are used to support the more traditional analog voice only wireless telephone networks.

A flexible call manager provides the interface between land-based communications systems and the radio frequency transmission system. The flexible call manager includes router and digital beam former elements in the packet switched embodiment and in the circuit switched embodiment is formed by the multiplexer and digital distribution network. Data coming to or from the antenna arrives either through a router (for packet switched network) or through a multiplexer (for a circuit switched network). Typically, packet switched network router traffic connects to the public switched telephone network through an H-323 gateway or directly to a packet switched network (e.g. the internet) while a circuit switched network multiplexer connects through a Class 5 switch to the public switched telephone network (PSTN).

Individual beams may be connected to a particular incoming PSTN source by the flexible call manager (i.e. the router and digital beam former elements). Since data being transmitted is in an internet protocol based format, in effect, each remote terminal has an internet protocol address. Each data stream (PSTN phone call, for example) is matched to a remote user by assignment of the remoter users internet protocol address. The flexible call manager provides this linkage and can provide an interface to user validation and network billing systems.

BRIEF DESCRIPTION OF THE DRAWING

Details of the invention, and preferred embodiments thereof, will be further understood upon reference to the drawing, wherein.

DETAILED DESCRIPTION OF PREFERRED EMBODIMENTS

Figure 1:
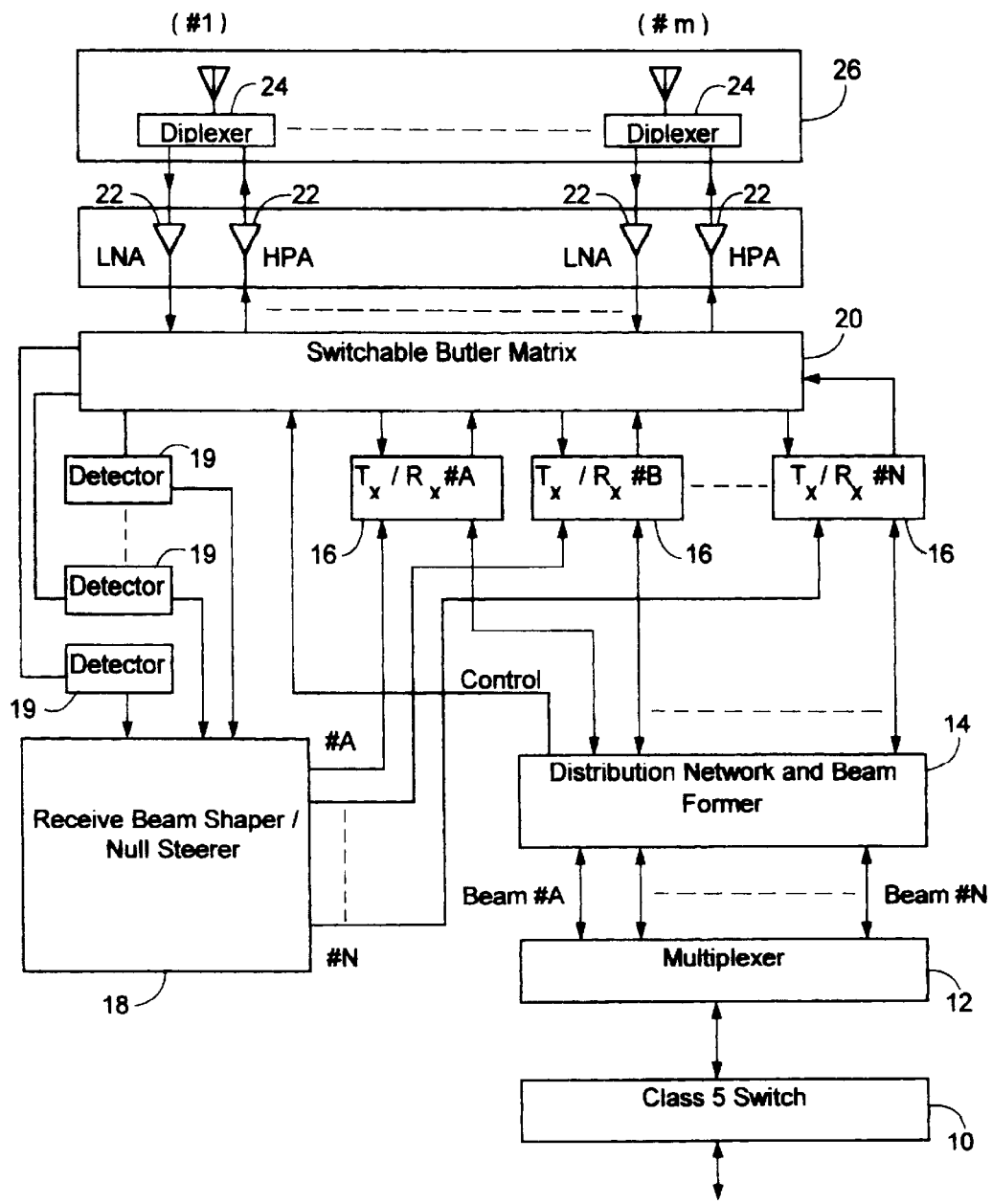
FIG. 1 is a block diagram of a first embodiment of a circuit switched network.

Referring to FIG. 1 there is seen a block diagram of a first version of a circuit switched network. The system is connected to a conventional public switched telephone network through a conventional Class 5 switch, typically a 5ESS switch from the Lucent company. A conventional multiplexer 12, typically a Digital Networking Unit (DNU) from Lucent for the 5ESS Switch, functioning as a digital combiner, combines and routes the multiple circuit switched, serial, digital data streams to a distribution network from the central office for forwarding to the appropriate sector antenna elements.

Distribution network and system controller 14, typically a Model 12000 Router from the Cisco company acts as a beam selector. The purpose of distribution network 14 is to route the serial digital data streams to the appropriate sector (antenna beam) via the Switch Fabric Cards (SFC) and the Clock Scheduler Cards (CSC) of the Model 12000 router. Distribution network 14 also appends the appropriate Demand Assigned Multiple access (DAMA) address for the wireless network layer for transmission by the transceiver modems. Distribution network 14 also serves as the system controller to optimize and select the appropriate beamwidths depending on the current traffic load pattern and available system site resources through a conventionally programmed included microprocessor, typically an Enterprise 3500 from Sun Microsystems. The number of beams, from beam #A to #N accords with the number of antenna elements, as described below.

A plurality of transceiver modem modules 16, the selection of which depends on the air standard employed (e.g., AMPS, GSM, CDMA, UMTS) typically for the GSM air standard, each a WAVEXpressBTS from the interWAVE company, function to convert the incoming, serial, digital data stream to a modulated radio frequency (RF) stream for transmission to the remote user. Conversely, these modules 16 also serve to convert the modulated RF signal from the remote user back into a serial digital data stream. This transceiver modem function is performed individually for each RF channel per sector. Transceiver modem modules 16 receive amplitude and phase commands from the receive beam shaper/null steerer 18, as described below, to achieve the commanded receive beam shape and/or null steering.

Receive beam shaper/null steerer 18, typically a conventionally programmed included microprocessor such as an HPC 3500 from Sun Microsystems, uses the digitized band limited, detected envelope from each of the minimum width beams for each channel to optimize the received beam shape for each channel to maximize received signal to noise ratio. The beam shaping feature is employed to accommodate those remote users located near a sector edge or for mobile remote users transiting from one sector to the next. In addition receive beam shaper/null steerer 18 will place antenna pattern nulls on the multi-path interference sources or other co-sector or adjacent sector interfering sources. Receive beam shaper/null steerer 18 provides amplitude and phase commands out to achieve the desired beam shape. Detectors 19 (also known as demodulators) form the band limited, detected envelope. Typically detectors 19 are Model UPC2766 IQ demodulators from California Eastern Laboratories.

A switchable Butler matrix 20, as originally described by J. Rutler and R. Lowe in "Beamforming Matrix Simplifies Design of Electronically Scanned Antennas," Electronic Design, Vol. 9, No. 7, pp. 170–173 and also described by Y. T. Lo and S. W. Lee, Antenna Handbook: Theory, Application and Design, pp. 18–23, 18–24, 19–8 to 19–12 and 19–80, such as are available from RANDTRON Antenna Systems interfaces with the receive beam shaper/null steerer 18 and the transceiver modem modules 16 to radiate the beamwidth desired for a given sector as determined to be optimum by the system controller. Typically, the desired beamwidth may be w° and the maximum beamwidth 2 kw°, ("k" being an integer number grater than zero) then the system bandwidths are w, 2w, 4w . . . 2 kw°. Then depending on the beamwidth selected for a given sector by the controller, solid state RF switches embedded in the matrix switch in the appropriate matrix elements to connect the desired sector input port to the corresponding antenna elements with the predetermined amplitude and phase to achieve the beamwidth selected and the corresponding sidelobe levels.

A plurality of amplifier modules each including a low noise amplifier 22 and high power amplifier 23, typically hybrid assemblies configured as redundant line replaceable components, such as the Model NE687MO3 LNA from California Eastern Laboratories or the model 10WD1000 HPA from Amplifier Research are provided, one pair for each antenna elements 24 in antenna array 26. Amplifier modules 24 convert the received very low power signals from remote users to a higher power for use by the remainder of the system. These amplifier modules 24 also convert the low power RF signals to high power for radiation by antenna array 18.

Antenna array 28 consists of a plurality of antenna elements 24, typically model MP8068PT from Maxrad. The preferred embodiment consists of the elements arranged into four flat panels of 10 elements vertically by 4 elements horizontally. While any suitable center to center spacing horizontally as well as vertically may be used between the elements, for best results the elements are arranged with 0.75 wavelength spacing vertically and 0.5 wavelength spacing horizontally. For example, if a 2° minimum beamwidth is desired, then m=288 (4 faces, 50.4°, 2° beamwidth, 0.707/0.5 spacing).

While any suitable antenna elements may be used, for best results the elements consist of crossed polarized wideband dipoles over a ground plane with stripline feed.

The function of the system shown in FIG. 1 is to form the wireless link or connection between the network central transmission site and the remote user. The specific protocol followed depends on the air standard employed (e.g., AMPS, GSM, CDMA, UMTS). Typically, the remote station, when initialized sends a handshake@ signal, which is received by the transmission site, which in turn sends a response. This continues at regular intervals until the remote site needs to initiate data transfer (e.g., a phone call) or there is data that needs to be sent to the remote site (e.g., an incoming call). Communications between two remote users may be considered as two symmetric remote to central site connections where the connections are tied together.

A remote user initiates a connection such as by pressing a send@ key on a mobile phone or a fax machine or activating a computer modem, etc. The signal passes through a low noise amplifier 22, enters switchable Baker matrix 20 and passes to a transceiver modem module 16. A fraction of the incoming signal is captured from each receiver and passed to beam shaper 18. Beam shaper, based on the signals received from each receiver, selects the number of antenna elements needed to create a shaped radiation pattern that minimizes receive strength and minimizes the number of elements and corresponding support equipment needed to provide reliable communications. The received signal also passes to distribution network 14 where the correct channel is selected for multiplexer 12 for further connections to the public switched telephone network or elsewhere.

The number of elements used in creating the antenna radiating pattern is in general not the same as the number of beams. The number of radiating elements is generally greater than the number of possible beams.

Based on the communication traffic requirements, the sector sizes of the antenna radiating pattern can be varied. During low-usage periods of the day, a few wide sectors (typically 4 at 90° each) may be all that is required to provide adequate user coverage. During high-usage periods of the day, up to 180 sectors of 2° each may be required. Sectors need not be the same size, so there could, for example, be 3 sectors of 30°, 4 of 60° and 3 of 10° each. However, each sector requires its own transceiver 16 to be configured into the link so the actual number of sectors is limited to the number of transceivers installed at the antenna site. The number of sectors and the size of each sector are determined by the microprocessor in distribution network/ beam selector 14.

Figure 2:
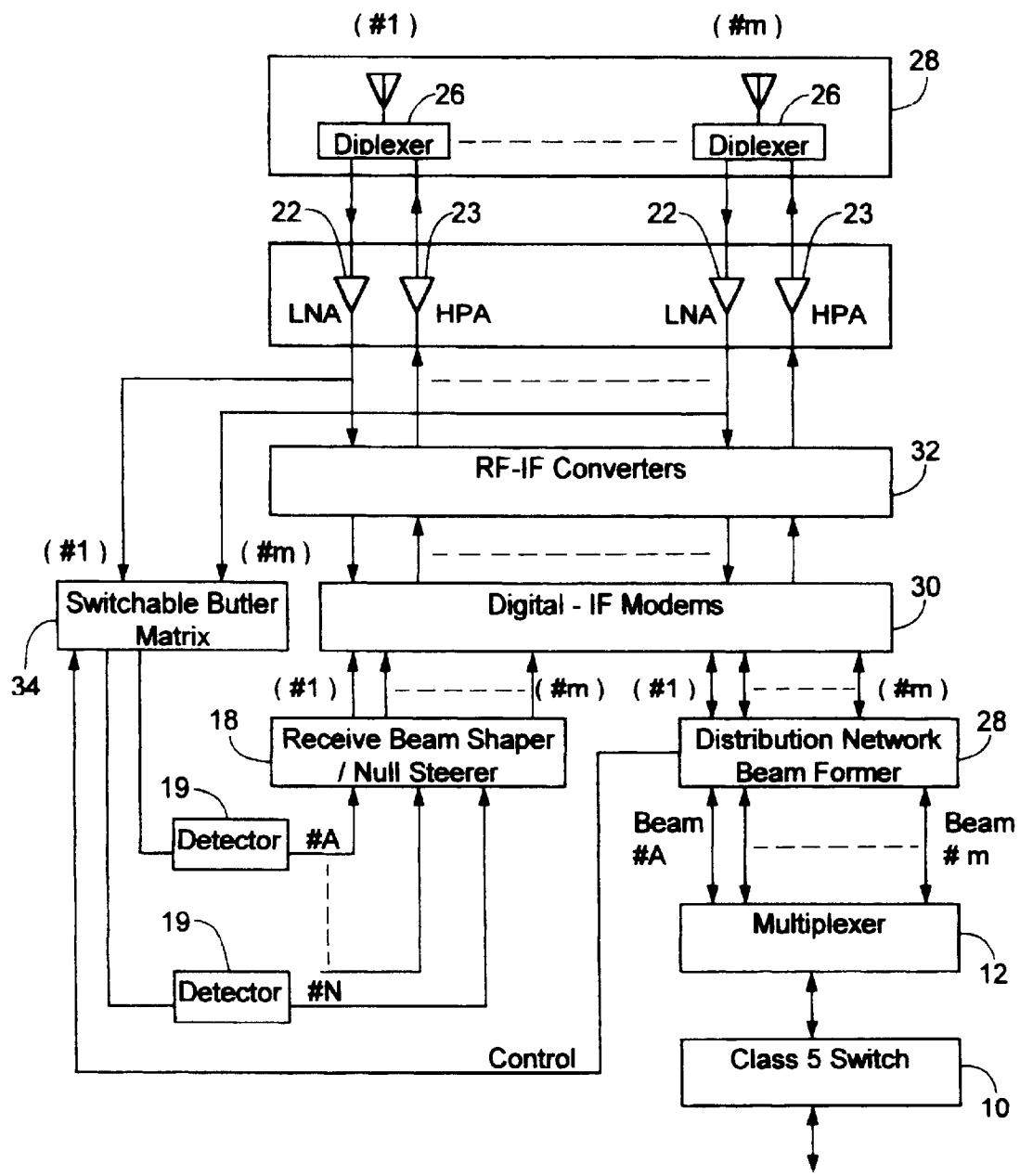
FIG. 2 is a block diagram of a second embodiment of a circuit switched network.

FIG. 2 shows in block diagram form a second preferred embodiment of a circuit switched network. In this embodiment, multiplexer 12, receive beam shaper/null steerer 18, amplifier modules 22, antenna elements 26 and antenna array 28 are the same as the corresponding elements shown in FIG. 1 and described above.

Digital distribution network/beam former 28, typically a conventionally programmed included microprocessor, such as an HPC 3500 from Sun Microsystems typically attached to a Model 12000 router from Cisco, provides the amplitude and phase information to each vector modulator which is incorporated into digital intermediate frequency (IF) modem array 30, typically a Model TDA5100 transmitter and a TDA5200 receiver from Infineon Technologies The vector modulator is connected to each antenna element 26 individually to form the individual beams for each sector. In addition, digital distribution network/beam former 28 routes each of the serial digital data streams to the appropriate beam to connect with the desired remote user terminal via the physical layer. The physical layer typically is layer 1 of the International Organization for Standards open systems interconnection basic reference communications model. It is the layer that actually represents the actual electromagnetic radiation transport. Also, the distribution network includes a microprocessor programmed in a conventional manner to serve as the system controller to optimize and select the appropriate beamwidths depending on the current traffic load pattern and available site resources.

An array of digital IF modems 30 (vector modulators and demodulators), typically an TDA5100 transmitter and TDA5200 receiver from Infineon Technologies, convert the incoming serial, digital, data stream to a modulated RF signal via IF converter 32. Digital IF modems 30 receive amplitude and phase commands from both the beam former 28 and receive beam shaper/null steerer 18 to achieve the correct receive beam shape and/or null steering.

RF/IF converters 32, convert the modulated IF signal to the digital RF modems 30 up or down to the desired RF frequency for transmission by antenna array 28 in the manner detailed above. RF/IF converters 32 also serve to convert the incoming RF signals from the antenna array 28 to IF and direct those signals to digital IF modem 32.

Switchable Butler matrix 34 receives various beams of predetermined beamwidth for each sector as determined by the system controller that is part of distribution network and beam former 28. Butler matrix 34 operates in the manner of Butler matrix 20, detailed above.

The function of the embodiment of FIG. 2 is basically the same as the function of the embodiment of FIG. 1, as discussed above. A remote user initiates a connection such as by pressing a send@ key on a mobile phone or fax machine or by activating a computer modem, etc. The signal from the remote transmitter is received by the base station antenna 26. The signal passes through the low noise amplifier 22, enters the RF to IF converters. Part of the incoming signal is captured from each low noise amplifier 22 and is passed through switchable Butler matrix 34 and on to beam shaper 18. By selecting the correct modules of digital to IF modem array 32, beam shaper 18 selects the number of antenna elements 26 needed to create a shaped radiation pattern that maximizes the receive signal strength and minimizes the number of elements 26 (and corresponding support equipment) needed to provide reliable communications. The received signal also passes to digital distribution network/beam former 28 where the correct channel is selected for multiplexer 12 and subsequent connection via switch 10 to the public switched telephone network.

Butler matrix 34 creates and controls N number of beams. To create these beams m number of antenna elements (with corresponding LNA/HPA modules and RF/IF modules) are used. The number of beams, N, is less than the number of antenna elements, m.

Based on communication traffic requirements, sector sizes of the antenna radiation pattern can be varied. As discussed above only a few sectors will be active during low usage periods while up to 180 sectors of 2 degrees each may be required during high-usage periods.

Figure 3:
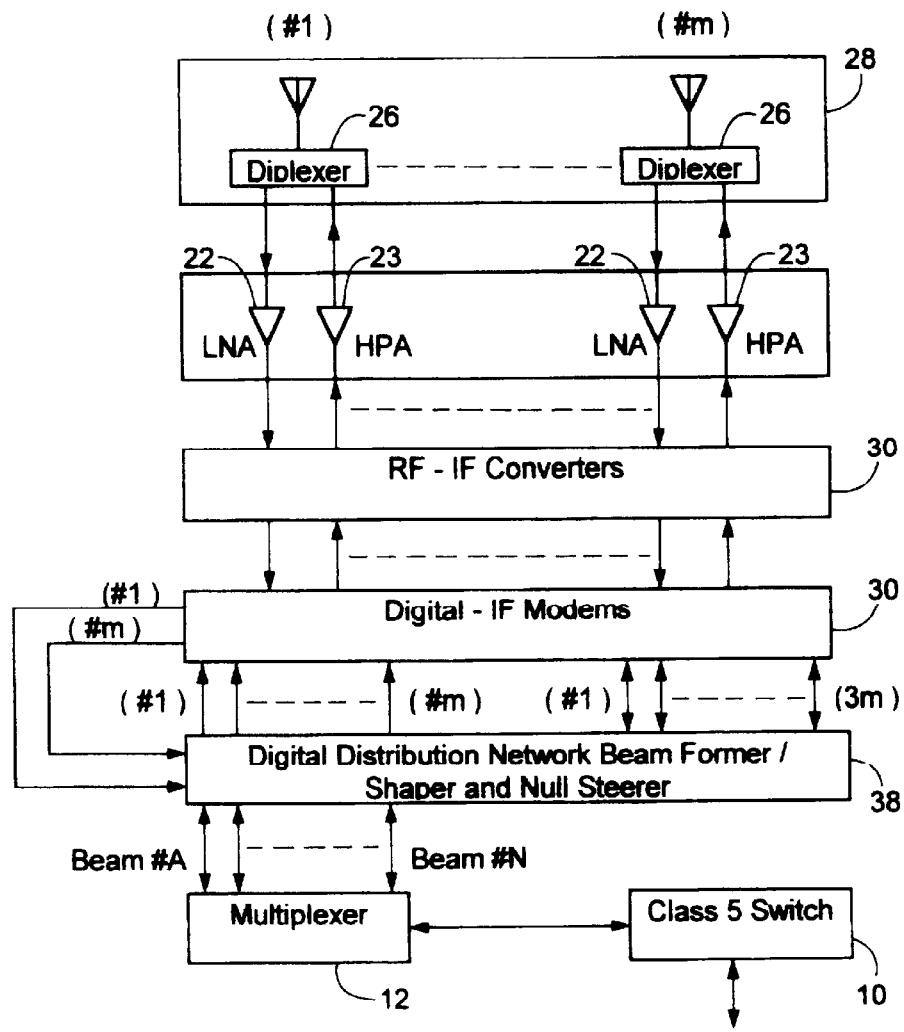
FIG. 3 is a block diagram of a third embodiment of a circuit switched network.

FIG. 3 illustrates a third embodiment of the system. This version is the most complex, most highly integrated and highest performing. Here, the functions performed by the Butler matrix, receive beam shape/null steerer and digital distribution network beam former have been all integrated into a single processing module, a conventionally programmed included microprocessor such as the HPC 3500 from Sun Microsystems as described above, but with the software hosted on one platform instead of multiple platforms.

In the embodiment of FIG. 3, Class 5 switch 10 the multiplexer 12, digital IF modem array 30 (up/down converter modules), amplifier modules 22 and 23 (LNAs/HPAs), antenna element array 28 and antenna elements 26 are generally the same as in FIG. 2. The basic function of the system is the same as discussed in conjunction with the description of the FIG. 1 embodiment.

A remote user initiates a connection such as by pressing a Asend@ key on a mobile phone or fax machine or by activating a computer modem, etc. The signal from the remote transmitter is received by the base station antenna 26. The signal passes through the low noise amplifier 22 to the RF-IF converters 30 and to digital IF modem modules 30. The linkage between the Digital IF modems and the digital distribution network beam former and null steerer unit 38 is such that information on signal strength is passed to the beam former in unit 38 where it is used to create the beam (selection of antenna amplifiers and elements) to obtain the optimum signal to interference ratio and, hence, the most efficient radiating pattern.

The beam former in unit 38, based on the signals received from each receiver, selects the number of antenna elements 26 (with corresponding LNAs 22 and HPAs 23) needed to create a shaped radiation pattern that maximizes the receiver strength and minimizes the number of elements (and corresponding support equipment) needed to provide reliable communications. The receive signal also passes to the digital distribution network portion of unit 38 where the correct channel is selected for the multiplexer and following connection to the public switched telephone network. Depending on the communication traffic requirements the sector sizes of the antenna radiating pattern may be varied in the manner discussed above.

Figure 4:
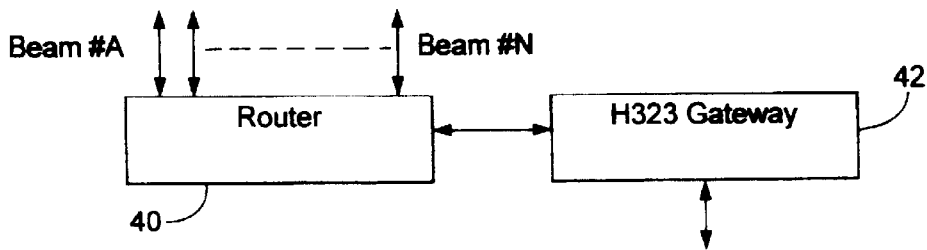
FIG. 4 is a detail block diagram showing replaced components for use of the system in a packet switched network.

FIG. 4 illustrates a way in which the systems shown in FIGS. 1–3, which are circuit switched networks, can be easily modified to perform as packet switched networks. A router 40 is substituted for multiplexer 12 and an H.323 gateway 42 is substituted for the class 5 switch in the FIGS. 1–3 embodiments. A typical suitable router 40 is available from Cisco under the Model 3500 designation. Router 40 functions to combine and route the multiple circuit switched, serial, digital data streams to and from an ITU H.323 gateway 42, which connects with the circuit 20 switched public switched telephone network, to the appropriate sector (antenna beam). Router 40 uses the packet address to route the data stream to the appropriate sector.

Other variations, applications and ramifications of the present invention will occur to those skilled in the art upon reading this disclosure. Those are intended to be included within the scope of this invention, as defined in the appended claims.

I claim:

1. A wireless communication network which comprises;
   a central facility comprising a plurality of radially arranged, substantially equally spaced, antenna elements for transmitting signals to, and receiving signals from, remote users;
   said antenna elements having beam widths totaling at least about 360° each of said antenna elements capable of simultaneous two way communication with multiple of said remote users;
   each of said beam widths formed by one or a plurality of said antenna elements, the size of said beam widths being inversely proportional to the number of antenna elements forming it;
   control means for increasing and decreasing beam width in inverse proportion to the number of active remote users; and
   means for turning some of said antenna elements on in inverse proportion to the number of said users and off in inverse proportion to the number of active remote users.

2. The wireless communications network according to claim 1 including a circuit switched network including a multiplexer to combine and route multiple circuit switched digital data streams between said central facility and said antenna elements.

3. The wireless communications network according to claim 2 wherein said circuit switched network includes switch for connecting to a public switched telephone network, a multiplexer connected to said switch and a beam selector comprising a distribution network and beam former for connection to said antenna elements.

4. The wireless communications network according to claim 3 wherein said public switched network further includes a gateway for connection to a public switched telephone network, a router and a distribution network beam selector for connection to said antenna elements.

5. The wireless communications network according to claim 1 including a packet switched network including a router to combine and route multiple circuit switched digital data streams between said central facility and said antenna elements.

6. The wireless communication network according to claim 4 further including a beam shaper/null steerer unit connected between said transceiver modem modules and said switchable Butler matrix to optimize the received beam shape for each signal from each antenna module to maximize received signal to noise ratio.

7. The wireless communications network according to claim 1 including an amplifier module and a transceiver modem module for each antenna element and a Butler matrix to cause a beam of predetermined beamwidth to be radiated under control of a microprocessor-based controller.

8. The wireless communications network according to claim 1 further including a receiver beam shaper/null steerer mans to optimize the received beam shape for each channel to maximize received signal-to-noise ratio.

9. The wireless communications network, and control means for increasing beam width as the number of users decreases and decreasing beam width as the number of users increases; and
   means for turning some antenna elements of said array on as said number of users increases and off as said number of users decreases according to claim 1 wherein said means for increasing and decreasing beam width has the capacity to vary beam angular width from about 2 to 120 degrees.

10. A wireless communications network which comprises:

a multiplexer for combining and routing multiple circuit switched, serial, digital data streams to and from a central office;

a distribution network for routing serial digital data streams between said multiplexer and predetermined antenna beams and to optimize and select beam widths;

a plurality of transceiver modem modules for converting an incoming serial digital stream from said distribution network to a modulated radio frequency stream for transmission by antenna beams and for converting a modulated radio frequency signal from antennas back into a serial digital data stream for transmission to said central office via said distribution network;

a switchable Butler matrix to receive a modulated radio frequency stream from said transceiver modules and direct it to said antennas at an optimum bandwidth and to receive a modulated radio frequency stream from said antennas and direct it to said transceiver modules;

a plurality of amplifier modules to amplify said modulated radio frequency streams passing to and from said switchable Butler matrix; and an antenna element array, each antenna element of said antenna element array capable of simultaneous two way communication with multiple remote users, each of said antenna elements for transmitting signals received from said amplifier modules and to direct received signals to said amplifier modules.

11. A method of providing wireless communication between a central facility and remote users, which comprises the steps of:

providing a plurality of radially arranged, substantially equally spaced, antenna elements for transmitting signals to, and receiving signals from, remote users;

said antenna elements together having beam widths covering at least about 360°;

when the number of users decreases, turning some of said antenna elements off and expanding beam width of the antenna elements remaining on to maintain said coverage; and when the number of users increases turning more of said antenna elements on and reducing beam width to maintain said coverage.

* * * * *